United States Patent
Messina et al.

(10) Patent No.: US 6,217,802 B1
(45) Date of Patent: Apr. 17, 2001

(54) POLYMER PELLETIZING INDEXING SYSTEM

(75) Inventors: Gregory S. Messina; Michael A. Tofte, both of Houston, TX (US)

(73) Assignee: Pelletizer Knives, Inc., Houston, TX (US)

(*) Notice: Subject to any disclaimer, the term of this patent is extended or adjusted under 35 U.S.C. 154(b) by 0 days.

(21) Appl. No.: 09/223,524

(22) Filed: Dec. 30, 1998

(51) Int. Cl.7 ............................... B27B 3/18; B29B 9/02
(52) U.S. Cl. .................... 264/40.1; 264/142; 425/313; 425/155; 425/168; 83/69
(58) Field of Search .................. 425/313, 311, 425/67, 168, 155, 62.1, 62, 69; 264/142, 40.1; 83/62.1, 62, 69

(56) References Cited

U.S. PATENT DOCUMENTS

| | | | |
|---|---|---|---|
| 3,749,539 | * 7/1973 | Galbreath et al. | 425/311 |
| 3,912,434 | 10/1975 | Nagahara et al. | 425/142 |
| 4,529,370 | 7/1985 | Holmes et al. | 425/142 |
| 5,110,523 | 5/1992 | Guggiari | 425/67 |
| 5,190,768 | 3/1993 | Ishida et al. | 425/142 |
| 5,330,340 | 7/1994 | Suppon et al. | 425/311 |
| 5,386,971 | 2/1995 | Ingram | 425/311 |
| 5,456,587 | 10/1995 | Ingram | 425/311 |
| 5,596,251 | 1/1997 | Miller | 425/142 |
| 6,142,046 | * 11/2000 | Mierau et al. | 83/62.1 |

* cited by examiner

Primary Examiner—Harold Pyon
Assistant Examiner—Thu Khanh T. Nguyen
(74) Attorney, Agent, or Firm—Thomason, Moser & Patterson (57) ABSTRACT

A polymer pelletizing apparatus includes a device for automatically and electronically indexing (advancing) a set of pelletizer knives by a predetermined distance upon the expiration of a predetermined time period. This advancement is continued for the useful life of the pelletizer knives and is called the advancement cycle. The predetermined distance and predetermined time period are entered into a PLC. The PLC is connected to an external advancing device such that when the PLC determines that the predetermined time period has expired, the PLC causes the external advancing device to index or advance the pelletizer knives by a predetermined distance. This advancement cycle provides consistent wear of the pelletizer knives and accurately provides an estimate of the need for a knife change.

17 Claims, 4 Drawing Sheets

POLYMER PELLETIZING INDEXING SYSTEM

BACKGROUND OF THE INVENTION

1. Field of the Invention

Broadly, this invention relates to a polymer pelletizing apparatus and to a system for controlling the position of pelletizing (cutting) knives or blades relative to a die in the polymer pelletizing apparatus. More particularly, this invention relates to a method and apparatus for electrically and automatically controlling the advancement of pelletizing knives relative to the die in the polymer pelletizing apparatus. In a specific embodiment, the invention relates to a system that advances (indexes) pelletizing knives a preset (predetermined) distance upon the expiration of a preset (predetermined) time period.

2. Description of Related Art

A polymer pelletizing apparatus typically includes a die for directing a molten polymer toward a series of pelletizing knives that cut the polymer into pellets. The pelletizing knives are attached to a drive shaft that rotates and can be advanced closer toward the die. The knives are designed so that when they are in proper contact with the die, they cut appropriately shaped and sized pellets. The contact between the rotating knives and the die causes the knives to be sharpened. Consequently, the knives also wear down. As the knives wear down, the distance between the die and the knives becomes larger. Although the distances involved are microscopic, they are nevertheless sufficient in magnitude to gradually cause the dimension and shape of the pellets cut by the knives to become irregular.

The present inventors have recognized that manually adjusting the knives creates problems because the knives are often moved too close to the die surface, resulting in excessive wear on the knives, and sometimes causing the knives to even break. On the other hand, the inventors have also recognized that with manual adjustment the knives may not be moved close enough to the die, i.e., resulting in excessive distance. The inventors have observed that this excessive distance causes the knives to become dulled as well as causing the production of irregular pellets. Still other times, the knives were not advanced at a proper time in that the manual adjustment was not made frequently enough, producing irregular polymer pellets, or was made too frequently, causing the knives to prematurely wear or break.

One approach is to maintain the knives in substantially constant pressure with the die. The inventors have observed that this approach does not adequately solve the problem because constant pressure causes the knives to wear too quickly, requiring a greater frequency of knife changes. Also, the necessary pressure is imprecisely determined and applied, often causing the knives to break. Furthermore, with these constant pressure devices, there is no way to predict when a knife change is needed. Thus, oftentimes, the pelletizing apparatus must be shut down to correct or adjust mechanical features or problems, and then later have to be shut down again for a knife change. In polymer pelletizing operations, these shutdowns cause great expense and inconvenience. If the need for a knife change could be accurately predicted, the pelletizing system could be shut down one time, to correct or adjust mechanical features and to change the knives. Accordingly, a need exists for not only controlling the indexing of the pelletizing blades to maximize their useful life, but also to accurately predict the exact time when such useful life is reached. In certain aspects, the present invention is directed to overcoming one or more shortcomings of previous methods and meeting needs of maximizing blade life and predicting blade changes.

SUMMARY OF INVENTION

The present invention provides a method of incrementally adjusting the position of pelletizing knives relative to a die in a polymer pelletizer to maximize the useful life of the knives while maintaining and producing consistent quality polymer pellets. The invention relates to an apparatus that incrementally advances the knives a predetermined distance at a predetermined time so as to maximize the use of the knives, maintain an acceptable knife sharpness and produce a quality pellet in shape and size. Specifically, the invention is directed to a method and apparatus for accurately and efficiently controlling the advancement (indexing) of pelletizing knives, preferably by advancing the pelletizing knives by a predetermined distance upon the expiration of a predetermined time period.

In a specific embodiment, a pelletizing apparatus of the invention includes a die with a surface having at least two apertures through it. The pelletizing apparatus also includes a drive shaft operably connected to a drive motor and at least one knife (blade) attached to the drive shaft. An advancing device is also included, which is operably connected to the drive shaft and operated to advance the drive shaft and the knives by a predetermined distance toward the die surface. The advancing device preferably acts to place the rotating knives in substantial contact with the surface of the die. The apparatus includes a programmable controller connected to the advancing device, wherein the programmable controller monitors the expiration of a predetermined time period and activates the advancing device to periodically and automatically advance the drive shaft and the knives by the predetermined distance toward the die surface after each expiration of the predetermined time period. Preferably, the predetermined time period and predetermined distance are constant. A timer (e.g., a clock) can be either included in the programmable logic controller or provided separately.

In another specific embodiment the invention is directed to a polymer pelletizing method, including the steps of: positioning rotating pelletizing knives at a first position; advancing the knives a predetermined distance in the direction of a die to a second position; stopping the advancement of the knives; maintaining the knives at the second position for a known predetermined period of time ("time interval"); advancing the knives another predetermined distance in the direction of the die to a third position; stopping the advancement of the knives and maintaining the knives at the third position. This sequence of advancing, stopping and maintaining the knives is repeated, preferably for the useful life of the knives. Preferably, all the time intervals are the same and the predetermined distances are identical. The first position of the knives is a starting position, i.e., a "zero point." The starting position is preferably established through a calibration procedure. After calibration, the distance between the first position and the final position of the knives (total advance distance) is preferably known in advance and preferably corresponds (i.e., can be correlated) to the maximum amount of wear on the knives. Not only is the total advance distance known, but the total advance time can also be known, based on the total of all the time intervals, plus any times associated with the actual advancing of the knives, which should be negligible.

Additionally, in another specific embodiment, a method of the invention includes inputting, into a programmable controller, a predetermined time period and a predetermined advance distance for the knives to be advanced. The method also includes advancing the knives periodically and automatically by the predetermined advance distance toward the die upon or after expiration of the predetermined time period. This method may also include the steps of detecting the expiration of the predetermined time period; sending a signal indicating the expiration of the time period; advancing the knives by the predetermined distance toward the die after detecting the expiration; and repeating the detecting, sending and advancing steps until the pelletizer has been in operation for the predetermined useful life of the knives.

In yet another specific embodiment, the method of the invention preferably includes a setup sequence, an advancement cycle sequence, and a knife change sequence. In the setup sequence, the method starts by advancing the rotating knives into contact with the die face and then recording this position as the start position of the knives. Preferably, this start position is set to zero. Also, as part of the setup sequence, the method includes inputting a predetermined advance distance to index the knives, inputting an overall distance (total distance) that the knives are to be indexed based on the useful life of the knives and inputting a predetermined time period when the knives are to be indexed by the predetermined distance. The advancement cycle sequence then starts, wherein the knives are periodically and automatically indexed by the predetermined distance after each expiration of the predetermined time period. That is, the knives are maintained in a substantially fixed or stationary position (relative to the die) for this predetermined time period (time interval). The advancement cycle sequence includes recording a position of the knives with respect to the start position as a total distance indexed, wherein the total distance indexed is recorded after each indexing of the knives. This sequence may preferably include adding the predetermined distance the knives are indexed to the start position after the expiration of the predetermined time period, recording this added distance as the advancement distance and adding the predetermined distance the knives are indexed to the advancement distance to get a total distance indexed after each expiration of the predetermined time period. The knife change sequence of this method includes providing an alert when the total distance indexed exceeds the overall distance. This alert is preferably an alarm that is activated based on whether the total distance is greater than the overall distance of the knives. The alert may also be a blinking light or a kill switch that shuts down the pelletizer. This sequence also includes replacing the knives and starting the entire cycle over with the setup sequence.

BRIEF DESCRIPTION OF DRAWINGS

Other objects and advantages of the present invention will become apparent from the following description taken in connection with the accompanying drawings which are set forth by way of illustration and example of specific embodiments of the present invention, where.

DETAILED DESCRIPTION OF SPECIFIC EMBODIMENTS

Specific embodiments of the invention will now be described as part of the detailed description. In the drawings, like elements have the same reference numbers for purposes of simplicity. It is understood that the invention is not limited to the specific examples and embodiments, including those shown in the drawings, which are intended only to assist a person skilled in the art in practicing the invention. Many modifications and improvements may be made without departing from the scope of the invention, which should be determined based on the claims below, including any equivalents thereof.

In a broad aspect, this invention relates to a polymer pelletizing apparatus (pelletizer) and a device associated with (or forming a part of) the pelletizer that accurately and efficiently controls the advancement (indexing) of a set of pelletizing knives so that the pelletizing knives are automatically advanced a predetermined distance at a predetermined time. Accordingly, this invention relates to a method and apparatus for advancing pelletizing knives by a predetermined distance upon the expiration of a predetermined time period. Preferably, this method and apparatus maximizes the use of the knives, maintains an acceptable knife sharpness and produces a quality pellet in shape and size.

Figure 1:
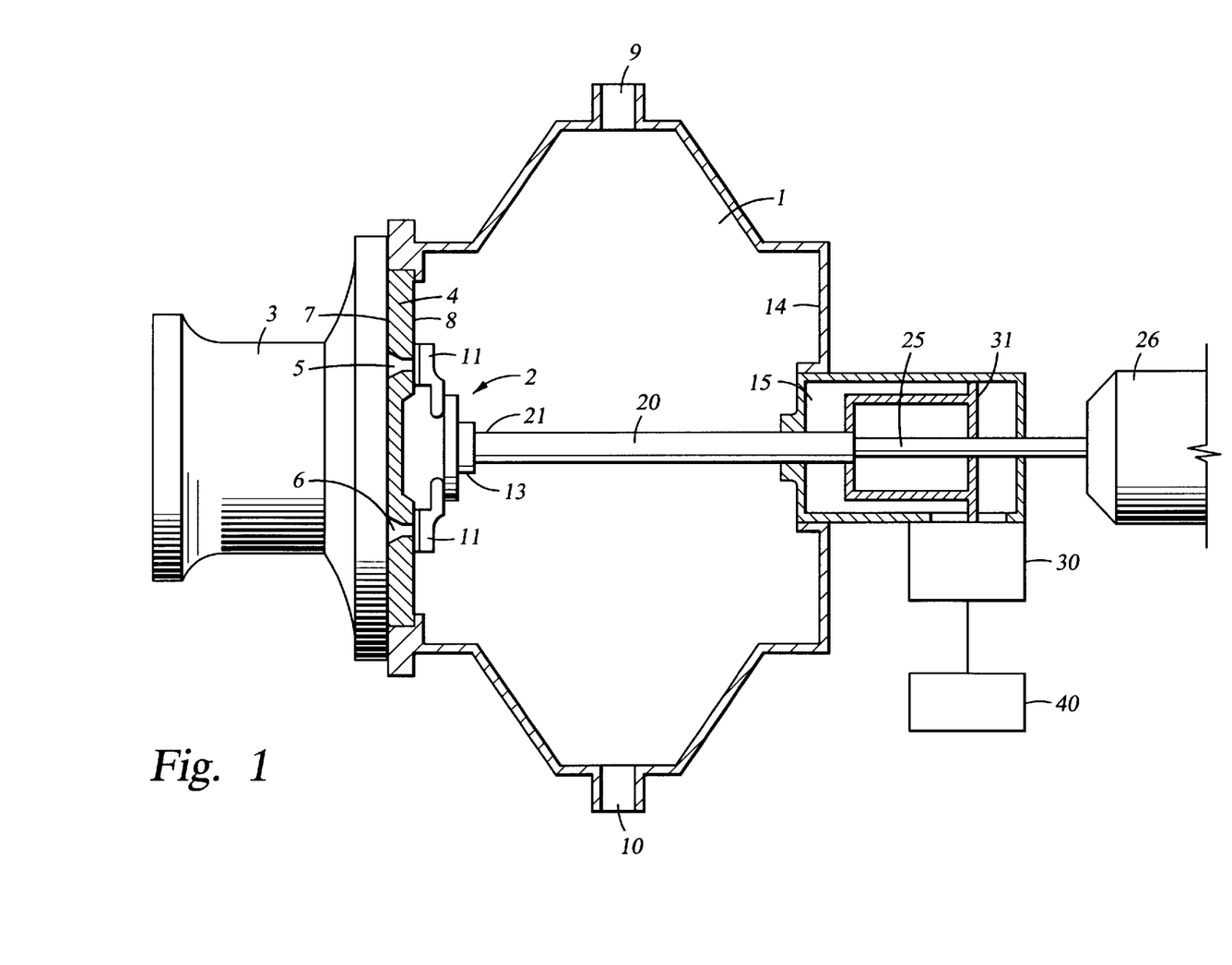
FIG. 1 is a diagrammatical, cross-sectional, side-view of a pelletizer apparatus embodying certain aspects of the invention.

Within these above descriptions, a more detailed explanation of a specific embodiment follows. Referring to FIG. 1, one type of a pelletizing apparatus is shown. However, it should be understood that any conventional pelletizer can be used when properly modified in accordance with the description herein. For example, a pelletizer manufactured by Werner & Pfleiderer, model # UG500, can be used, modified in accordance with this invention. U.S. Pat. No. 5,190,768 describes the components and operation of another type of pelletizer. Accordingly, to the extent it does not contradict the disclosure herein, the disclosure in U.S. Pat. No. 5,190,768 is incorporated by reference. The pelletizing apparatus, as shown in FIG. 1, includes a chamber 1 and a knife assembly 2 positioned in the chamber 1 for cutting pellets of polymer material that are extruded through a channel or extruder 3 and then through a die 4. The die 4 has two surfaces, a die face 8 adjacent the chamber 1 and a die back 7 adjacent the channel or extruder 3. The die 4 also includes at least two apertures 5, 6 through the die back 7 and die face 8. Preferably the aperture in the die back 7 is large and is manufactured such that it narrows into a smaller aperture in the die face 8. Typically, a molten polymer material is pushed through the channel or extruder 3 and then into the apertures 5, 6 in the die back 7. The molten polymer continues to be pushed through the channel or extruder 3 and die 4 until the polymer exits the die 4 through the small aperture in the die face 8. The knife assembly 2, consisting of pelletizer knives 11 releasible mounted to a knife hub 13, rotates so that the pelletizer knives 11 cut or slice the polymer material pushed through the die 4.

The knife assembly 2 is mounted on a rotatably driven and axially moveable shaft 20. Preferably, the knife assembly 2 is mounted on the end 21 of the shaft 20. The shaft 20 extends through the chamber 1 and a wall 14 of the chamber 1. A sealing chamber 15 is provided to seal the chamber 1 and enclose the shaft 20. The shaft 20 extends into the sealing chamber 15 and is operably connected to inner shaft 25. Inner shaft 25 extends out of the sealing chamber 15 and is operably connected to a drive motor 26. The drive motor 26 operates to rotate the inner shaft 25 and subsequently cause the knife assembly 2 to rotate. It is understood that different assemblies may be used to accomplish the rotational and axial movement of the knife assembly 2 and pelletizer knives 11. For example, the inner shaft 25 may be disposed through shaft 20 and attached to the knife assembly 2 so that the inner shaft 25 causes rotation while the shaft 20 causes the axial movement. In the same manner, other combinations of shafts or mechanical features may be used to rotate and axially advance the pelletizer knives.

The knife assembly 2 is preferably positioned at the end 21 of shaft 20 so that it rotates adjacent the die face 8 of the die 4. As described above, the knife assembly 2 is comprised of a plurality, for example, 4–10, pelletizer knives 11 which are releasably mounted to the knife hub 13. While other conventional connections could be used, it is important that the pelletizer knives 11 be positioned so they rotate adjacent the die 4 and can be replaced when necessary.

The chamber 1 has an inlet slot 9 and an outlet slot 10 to allow water to be pumped through the chamber 1 for cooling the molten polymer pellets as they are formed and for cooling the rotating pelletizer knives 11 as they contact the die face 8 and become heated due to friction. The water also carries off the formed pellets from the chamber 1. Either slot can be the inlet slot with the other slot being the outlet slot. Because the polymer is cut in water, the pelletizer is often called an underwater pelletizer.

An advancing device 30 is provided to advance the shaft 20 and consequently the pelletizer knives 11 toward the die face 8. Preferably, the advancing device is an external advancing device 30 which is operably connected to the shaft 20 so as to incrementally move the shaft very small distances, e.g., $1/10,000$ of an inch. The external characteristic of the advancing device is preferable so that existing pelletizers can be retrofitted or modified to include the invention. In this manner, the benefits of the invention can be realized without the high cost of an entirely new pelletizer. It is understood that the advancing device 30 can be any conventional motor or device that can precisely and accurately advance objects in small increments. For example, this advancing device 30 may be a conventional servo motor, such as motors manufactured by Electrocraft, model # N-3412-2-H00AA. As another example, the advancing device 30 may be a stepper motor and an associated driver.

The advancing device 30 may be connected to an advancing brace 31 within the sealing chamber 15. The advancing brace 31 is attached to the shaft 20 so that when the advancing brace 31 is advanced by the advancing device 30, the shaft 20 and the knife assembly 2 move toward the die face 8. The advancing brace is connected to the shaft 20 in such a manner as to not impede the rotational movement of the shaft 20. While the connection of the advancing device 30 as described above is merely an example, several other connections between an advancing device 30 and the shaft 20, for advancing the shaft and the knife assembly 2 toward the die face 8, may be successfully used. For example, a worm drive connection or a gear and teeth connection may be used. These examples are not intended to limit the type of connections that can be used, but are described to assist a person skilled in the art in practicing the invention. Also, it is recognized that the advancing device 30 can be an internal advancing device. In other words, a motor or device that is already associated with the pelletizer to advance the pelletizer knives can be adjusted (retrofitted) to operate according to the invention described herein. In this manner, the advancing device may already be operably connected to the shaft 20. The advancing device 30 may be positioned outside the sealing chamber but within a housing that encloses sections of the pelletizer or it may be disposed inside the sealing chamber 15. Still further, a new pelletizer could be constructed including an advancing device.

In a specific embodiment of the invention, a programmable logic controller (PLC) 40 is provided. The PLC 40 may be of any conventional type and is preferably connected to the advancing device 30. As described above, the PLC 40 may be connected to an advancing device already associated with the pelletizer and already configured to advance the pelletizer knives. The PLC 40 is programmed to specify the time when the shaft 20 and the pelletizer knives 11 are advanced by the advancing device 30. The PLC 40 sends a signal to the advancing device at the predetermined time. The PLC 40 preferably includes an input device by which an operator can enter the time period, which upon the expiration thereof, the pelletizer knives 11 are advanced. The input device may be a keyboard and a LCD. The input device may also be a computer attached via a modem link or infrared connection to the PLC. The computer, preferably a laptop computer, linked to the PLC can download and program the PLC with the time and distance information. The time interval or period can be varied based on the product that is being pelletized. Thus, it is important for an operator to be able to adjust the time interval in order to optimize knife life and create consistent wear of the knives. The PLC 40 also specifies the distance that the shaft 20 and the pelletizer knives 11 are advanced by the advancing device 30. Using the input device of the PLC 40, the operator can also enter the distance the pelletizer knives 11 are advanced. This distance is critical for optimum knife life and pellet quality. Further, using the input device of the PLC 40, the operator can enter the total distance the knives 11 can be advanced, hereinafter referred to as the "Knife Life Distance." Still further, using the input device of the PLC 40, the operator can enter the total time that the knives 11 can be advanced, i.e., "Knife Life Time."

While the PLC preferably includes an input device, the PLC may alternatively be pre-programmed with the predetermined distances and times at the factory before it is installed on the pelletizer. The PLC 40 monitors the expiration of each predetermined time period and then activates the advancing device 30, e.g., the servo motor, to advance the drive shaft 20 and the pelletizer knives 11 by the predetermined advance distance. Preferably, the predetermined time period is the same. The PLC 40 should be set up such that the pelletizer knives 11 are advanced toward the die surface after each expiration of the predetermined time period. In an alternative embodiment, the pelletizing apparatus includes a timer connected to the programmable controller which activates the advancing device to advance the knives the predetermined advance distance when the timer indicates that a certain time interval has passed since the previous knife advancement. The timer could be programmed to count for the predetermined time interval. With the use of the timer and the PLC 40, the expiration of the predetermined time interval can be indicated.

Figure 2:
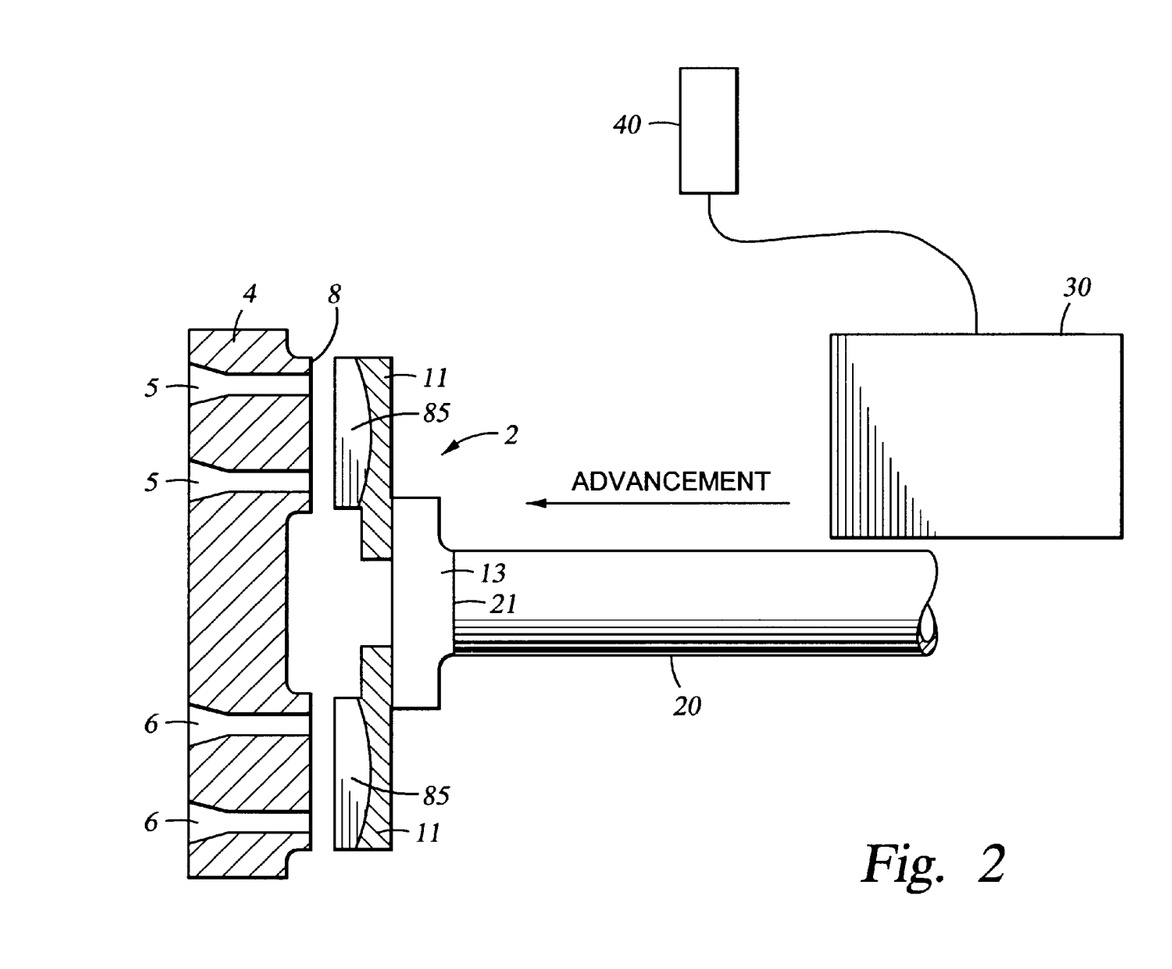
FIG. 2 is a diagrammatical view, partially in section and enlarged, of a pelletizer apparatus showing the relationship between a die and a set of pelletizer knives.

Referring to FIG. 2, a enlarged view of the die 4, the knife assembly 2 and the shaft 20 is shown. The external advancing device 30 is also shown connected to the PLC 40. The space between pelletizer knives 11 and die face 8 is gap 80. Gap 80 may be, for example, approximately $1/1000$ of an inch. While this distance is merely one example, the distance or gap 80 will always be a small distance, approximately between $1/100$ and $1/10,000$ of an inch. Accordingly, the predetermined advancement distance entered by the operator into PLC 40 is very small. As such, the advancing device 30 must be very precise and capable of moving the shaft 20 and pelletizing knives 11 a small precise distance.

As also shown in FIG. 2, the pelletizer knives 11 have a blade portion 85. These knives are capable of being sharpened and are manufactured for the express purpose of cutting the polymer. Each time the pelletizer knives 11 are advanced toward the die face 8, the blade portion 85 of the pelletizer knives 11 is sharpened. Because blade portion 85 is a finite distance, the knives 11 can only be advanced a limited number of times before blade portion 85 is no longer capable of cutting the polymer. In other words, the knives have a finite knife life. In accordance with this invention, based on the knife life, the timing of a knife change can be accurately predicted. This is also called the predetermined useful life of the knives.

Figure 4:
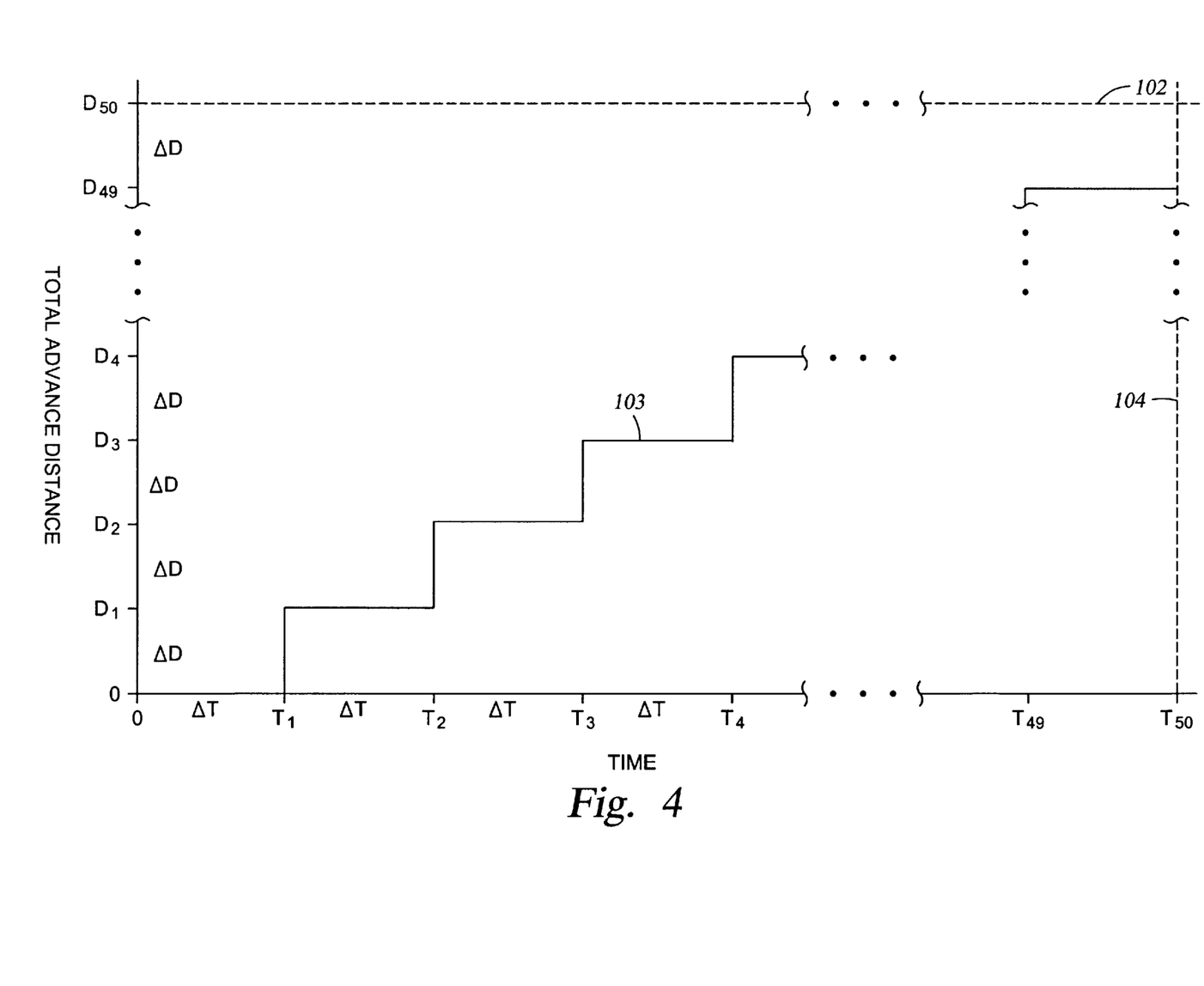
FIG. 4 is a time-line illustrating aspects of certain embodiments of the invention.

The following example, described with respect to FIGS. 2 and 4, explains how a knife change can be predicted in accordance with this invention. Blade portion 85 of the pelletizer knives 11 may have a usable size of 0.05 inch which can be sharpened over a 5 minute period to decrease area 85 by 0.0005 inches. The allowable gap 80 may be 0.001 inches. Accordingly, the predetermined indexing distance (represented in FIG. 4 as "ΔD") is set to 0.001 inches so that when the pelletizer knives 11 are advanced 0.001 inch, the knives 11 contact the die face 8. After this contact is made, the knives begin to sharpen (wear) and in 10 minutes the knives have worn 0.001 inches, restoring the gap 80 to 0.001 inches. Accordingly, the predetermined time period is set to 10 minutes (represented in FIG. 4 at "ΔT"). The knives are again advanced and sharpened. This is represented by the step-like function 103 in FIG. 4. That is after each ΔT (10 minutes) the knives are advanced by ΔD (0.001 inches). This cycle continues until the knives are no longer useful or capable of being sharpened. According to the values provided in this illustration, advancement can occur 50 times until the blade portion 85 of the pelletizer knives 11 is consumed. This is represented as D50 and dashed line 102 in FIG. 4. The estimated cycle time-the predicted time that the knives 11 will need to be changed-is 500 minutes or 8 hours and 20 minutes after the cycle has started. This is represented as T50 and dashed line 104. Thus when the total distance traveled is equal to the Knife Life Distance, 0.05 inch (D50), and/or the total cycle time is equal to the Knife Life Time, 500 minutes (T50), the knives need to be changed. Accordingly, using the methods of this invention, the time that a knife change is needed can be accurately predicted.

Figure 3:
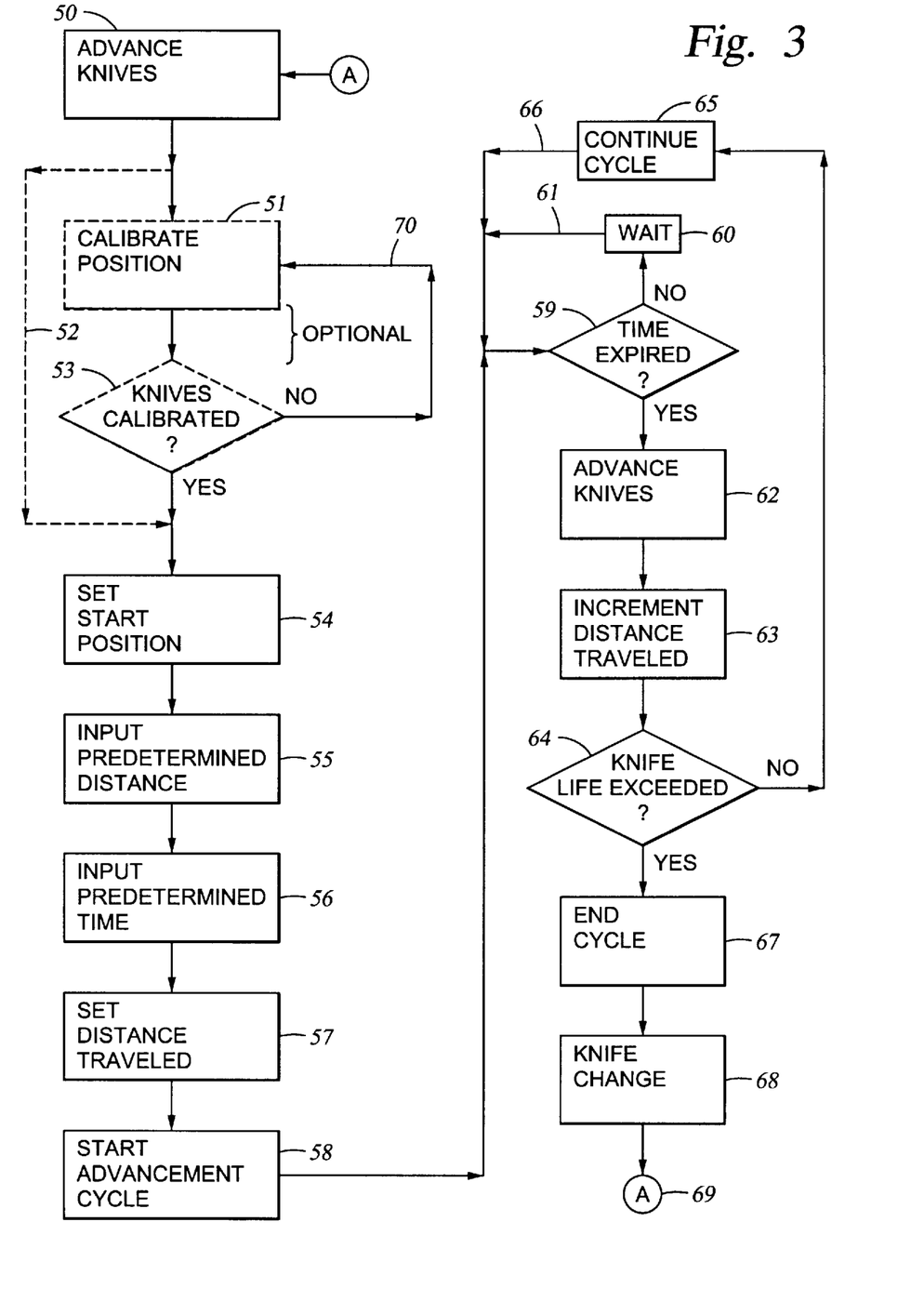
FIG. 3 is a flow chart depicting the operation of certain aspects of the invention.

Referring to FIG. 3 and FIG. 1, the operation of the pelletizer, i.e., the method of advancing a set of pelletizing knives will now be described. The operation of the system begins with the operator turning on the drive motor 26 to start the rotation of the pelletizer knives 11. As indicated by "Advance Knives" step 50, the rotating pelletizer knives 11 are advanced until they make initial contact with the die face 8. In a preferred embodiment of the invention, the method includes a calibration procedure for determining and setting a starting position of the pelletizer knives. In this calibration procedure, the pelletizer knives 11 are advanced until the pelletizer knives 11 are positioned so that the drive motor 26 is operating in a predetermined range. This range preferably relates to a predetermined range of amps measuring the load/resistance on the drive motor 26. The higher the resistance the higher the amperage. A monitor (e.g., amp meter) may be attached to the drive motor 26 so that when the reading on the monitor reaches a certain level, the advancement of the pelletizer knives can be stopped. The act of connecting such a monitor to a drive motor in a pelletizing apparatus is conventional and known by persons skilled in the art. These calibration steps are shown with respect to FIG. 3, and labeled "Calibrate Position," step 51 and "Knives Calibrated?," step 53. "Knives Calibrated?," step 53, is the step where the decision is made whether the pelletizer knives 11 are positioned so that the drive motor 26 is operating in the predetermined range. While, as described above, this range is preferably a range of amps measured from the drive motor 26, the predetermined range may also be based on the amount of conductivity between the knives 11 and the die face 8 or some other measurable feature that indicates the desired position of the knives 11. If the position of the knives results in a measurement within the predetermined range, the calibration procedure continues to "Set Start Position," step 54. If the position of the knives does not result in a measurement within the predetermined range, then the operation returns to the "Calibrate Position" step 51, as shown by connecting line 71. In the "Calibrate Position" step 51, the knives 11 are continued to be advanced and monitored ("Knives Calibrated?" step 53) to see if the position of the knives 11 results in a measurement within the predetermined range. This calibration procedure continues until the position of the knives 11 results in a measurement within the predetermined range. As mentioned above, this calibration procedure is optional and may be eliminated by continuing from the "Advance Knives" step 50 to the "Set Start Position" step 54 as shown by connecting line (dashed) 52. While this calibration procedure is optional, the preferred operation of the system is to calibrate the start position of the pelletizer knives 11 so they can be used for a longer time, with less wear, producing more accurate and appropriate pellet sizes and shapes.

After calibrating the position of the knives 11, in the "Set Start Position" step 54, the position of the knives is set as a zero point i.e., the starting position of the knives. Preferably, the drive motor 26 is then turned off and the pelletizer knives 11 are backed off the die face 8 so the setup of the advancement cycle can be completed as indicated by steps 55, 56 and 57. The knife start position was entered in the "Set Start Position" step 54 so that the after the advancement setup is complete, the knives can be moved back to the start position to begin the advancement cycle. Alternatively, the set up of the advancement cycle may be performed before the calibration and thus the pelletizer should not have to be shut down after calibration. However, it is advantageous to calibrate first and then perform the set up of the advancement cycle, i.e., setting the predetermined time and distance and setting the knife life of the pelletizer knives, because the calibration causes the consumption (wear) of part of the knives thus reducing the knife life. Accordingly, if knife life is set after calibration, a more accurate value can be entered.

After the drive motor 26 is turned off and the pelletizer knives are backed away from the die face 8, the operator inputs into the PLC 40 the predetermined distance the pelletizer knives 11 are to be advanced, as depicted in "Input Predetermined Distance" step 55. The predetermined distance may be varied based on the type of pelletizer knives 11 used, the type of die 4 used and the type of polymer being cut. Preferably, the distance is selected by the operator to optimize the life of the pelletizer knives 11 and the polymer pellet quality. An example of this distance is described above. The operator also inputs into the PLC 40 the predetermined time period when the knives are to be advanced by the predetermined distance, as described in "Input Predetermined Time" step 56. Like the predetermined distance, the predetermined time period may be varied based on the type of polymer being cut, the type of pelletizer knives 11 being used and the type of die 4 being used. Preferably, the time is selected to optimize the life of the pelletizer knives 11 and the polymer pellet quality. An example of this time is also described above. In the last setup step, "Set 'Distance Traveled'" step 57, the total distance traveled in a cycle, labeled "Distance Traveled," is set to zero, the start position of the pelletizer knives 11. The "Distance Traveled" label may be represented by variable "DT." The predetermined useful knife life (Knife Life Distance and/or Knife Life Time) may also be entered. As mentioned above, it is best to enter these values after calibration is complete so the Knife Life Distance and Knife Life Time is accurate.

In "Start Advancement Cycle" step 58, the advancement cycle is started. This step includes restarting the drive motor 26, returning the pelletizer knives to the start position determined in step 54 and starting a timer. As mentioned above, the timer can be either included as part of the PLC or provided separately. At this point the PLC 40 and the external advancing device 30 work to perform the advancement sequence consisting of automatically advancing the pelletizer knives 11 by the predetermined distance upon each expiration of the predetermined time period. This procedure is depicted in steps 59 through 65. In "Time Expired?" step 59, the PLC 40 determines whether it has reached the predetermined time period. If the time has not reached the predetermined time period, the operation of the system proceeds to "Wait" step 60, where the system waits. From step 60, the operation then returns to step 59, as indicated by connecting line 61, where the PLC 40 again determines whether the predetermined time period has expired. If the predetermined time period has expired, the PLC 40 causes the advancing device 30 to advance the pelletizer knives 11 by the predetermined distance as depicted in "Advance Knives" step 62.

After advancing the pelletizer knives 11, the stored value corresponding to the total distance that the pelletizer knives have traveled is adjusted. As shown in "Increment Distance Traveled" step 63, the value in the label "Distance Traveled" (DT) is added to the predetermined distance the knives were advanced in step 62 (labeled "Predetermined Advancement Distance" and represented by the variable PAD). This sum is stored as the new total distance traveled under the label "Total Distance Traveled," represented by the variable "TDT." This calculation can be represented as: Total Distance Traveled =Distance Traveled +Predetermined Advancement Distance (TDT =DT +) PAD). The value in the variable TDT is then copied and stored in the variable DT so the Total Distance Traveled can be properly incremented the next time the knives are moved. Also, the value for "Total Distance Traveled" is then compared, as depicted in "Knife Life Exceeded?" step 64, to the total distance that the pelletizer knives 11 are to travel based on the life of the pelletizer knives 11, ("Knife Life Distance"). The Knife Life Distance can either be a value inputted into the PLC 40 during setup or merely a number that the operator knows. Alternatively, the determination of whether the cycle should continue, i.e., whether the knife life has expired, can be based on the total actual run time of the system compared to the total expected run time of the system (the "Knife Life Time"). For example, as described above, the Knife Life Time may be 8 hours and 20 minutes. If the total actual run time is less, the cycle continues. This is similar to the predicted time for a knife change described above.

Continuing with the explanation of step 64, if the Knife Life Distance is entered into the PLC 40, then the PLC does the comparison of the Total Distance Traveled to the Knife Life Distance. If the Total Distance Traveled is not greater than or equal to the Knife Life Distance, the timer is restarted as in "Continue Cycle" step 65. Upon restarting the timer, the operation returns to the "Time Expired?" step 59 as indicated by connecting line 66. The operation then determines whether the predetermined time has expired, step 59, upon which it advances the knives by the predetermined distance, step 62, updates the Total Distance Traveled value as in step 63 and then again compares the Total Distance Traveled to the Knife Life Distance, as in step 64. This loop or cycle continues until the Total Distance Traveled is greater than or equal to the Knife Life Distance, whereupon the PLC 40 indicates that the pelletizer knives 11 need to be changed as indicated by "End Cycle" step 67. As described above, the decision to change the knives can also be based on time, i.e., the Knife Life Time. The drive motor 26 is then turned off and the pelletizer apparatus is shut down so the pelletizer knives can be changed as described in "Knife Change" step 68. After the pelletizer knives 11 have been changed, the cycle starts over again at "Advance Knife" step 50, as indicated by "connector A" 69.

If the Knife Life Distance is not entered into the PLC 40, then the operator can perform the comparison of the Total Distance Traveled with the Knife Life Distance as described in step 64. If the Total Distance Traveled is not greater than or equal to the Knife Life Distance, the operator does not take any action and the PLC 40 restarts the time as in step 65. Upon restarting the timer, the operation returns to step 59 as indicated by connecting line 66. The PLC 40 then determines whether the predetermined time has expired, step 59, upon which it advances the knives by the predetermined distance, step 62, and updates the Total Distance Traveled value as in step 63. The operator then again compares the Total Distance Traveled to the Knife Life Distance, as in step 64. If the Total Distance Traveled is not greater than the Knife Life Distance then the operator takes no action and the loop or cycle continues until the operator determines that the Total Distance Traveled is greater than or equal to the Knife Life Distance. As described above, the operator may also make this determination based on time. If the operator knows how long the knives should last, i.e., the Knife Life Time, and also knows how long the system has been operating, the time for a knife change can be estimated. When the operator makes this determination, the operator indicates a knife change is needed as indicated by step 67 by turning off the drive motor 26. Once the drive motor 26 is turned off, the pelletizer apparatus is shut down and the pelletizer knives are changed as described in step 68. After the pelletizer knives 11 have been changed, the cycle starts over again at step 50, as indicated by "connector A" 69.

Using this apparatus and device, as described above, provides a consistent estimator of when pelletizer knives 11 will need to be changed. Additionally, this method and apparatus improves the efficiency of knives as the rate of wear is predictable and consistent. Further, pelletizer knife changes can be scheduled with the maintenance of other components of the pelletizing apparatus so that additional shutdowns can be avoided.

What is claimed is:

1. A method of advancing knives against a die in an underwater polymer pelletizing system, wherein the knives are rotated against the die and have a predetermined useful life, comprising:

inputting, into a programmable controller, a first predetermined time period a first predetermined advance distance for the knives to be advanced;

advancing the knives by the first predetermined advance distance toward the die upon or after the expiration of the first predetermined time period;

advancing the knives by one or more additional predetermined advance distances upon or after the expiration of additional predetermined time periods;

providing an alert when the sum of the first and additional predetermined advance distances corresponds to a predetermined total distance, or when the sum of the first and additional predetermined time periods corresponds to a predetermined total time, wherein the predetermined total distance or the predetermined total time corresponds to a useful life of the knives; and replacing the knives.

2. A method of advancing knives according to claim 1, further comprising:

detecting the expiration of the first predetermined time period;

repeating the detecting and advancing steps until the pelletizer has been in operation for the predetermined useful life of the knives, wherein providing the alert includes activating an alarm.

3. The method of advancing knives according to claim 1, further comprising storing the predetermined time period and predetermined advance distance.

4. The method of advancing knives according to claim 1, further comprising calibrating a start position of the knives.

5. The method of advancing knives according to claim 1 wherein the predetermined useful life of the knives is based on a total time that the knives may be used and wherein the total time the knives may be used is determined before the knives are advanced by the first predetermined advance period.

6. The method of advancing knives according to claim 1 wherein the predetermined useful life of the knives is based on a total distance that the knives may be advanced.

7. An underwater pelletizing apparatus comprising:

a die having a surface and at least two apertures through the surface;

a drive shaft operably connected to a drive motor;

at least one blade attached to the drive shaft;

an advancing device operably connected to the drive shaft operating to advance the drive shaft and the blades by one or more predetermined distances toward the die surface to place the rotating blades in contact with the surface of the die;

a programmable controller connected to the advancing device, wherein the programmable controller monitors the expiration of one or more predetermined time periods and activates the advancing device to advance the drive shaft and the blades by at least one of the predetermined distances toward the die surface after expiration of at least one of the predetermined time periods;

and wherein the programmable controller provides for activation of an alert when the blades have been advanced a predetermined total distance, the alert signifying the need to change the blades.

8. The underwater pelletizing apparatus according to claim 7, further comprising a external timer connected to the programmable controller.

9. The underwater pelletizing apparatus according to claim 7, wherein the programmable controller includes a timer.

10. The underwater pelletizing apparatus according to claim 7, wherein the advancing device includes a servo motor.

11. The underwater pelletizing apparatus according to claim 7, further comprising an input device linked to the programmable controller wherein the predetermined distances and predetermined time periods are input.

12. A method of indexing knives against a die face in an underwater polymer pelletizing system, wherein the knives rotate with respect to a die and have a predetermined useful life comprising:

positioning the rotating knives at a first position;

advancing the knives in the direction of the die to a second position;

stopping the advancement of the knives;

maintaining the knives at the second position for a predetermined time period;

advancing the knives in the direction of the die to a third position; and stopping the advancement of the knives; and providing an alert when the knives have been advanced a predetermined total distance, the alert reflecting the need to change the knives.

13. The method of indexing knives according to claim 12, further comprising repeating the advancing, stopping and maintaining steps for the useful life of the knives, and then replacing the knives.

14. The method of indexing knives according to claim 12, wherein the knives are advanced by a predetermined distance.

15. The method of indexing knives according to claim 14, further comprising:

inputting into a programmable logic controller the predetermined distance to index the knives; and inputting into a programmable logic controller the predetermined time period to index the knives by the predetermined distance.

16. The method of indexing knives according to claim 15, further comprising recording the first position as a start position of the knives.

17. The method of indexing knives according to claim 16, further comprising:

setting the start position as zero;

adding the predetermined distance the knives are indexed to the start position after the expiration of the predetermined time period;

recording this added distance as the distance traveled;

adding the predetermined distance the knives are indexed to the distance traveled to get a total distance traveled after each expiration of the predetermined time period; and replacing the knives with new knives after the total distance is reached.

* * * * *